US007912800B2

(12) United States Patent
Sattler et al.

(10) Patent No.: US 7,912,800 B2
(45) Date of Patent: Mar. 22, 2011

(54) DEDUCTION ENGINE TO DETERMINE WHAT CONFIGURATION MANAGEMENT SCOPING QUESTIONS TO ASK A USER BASED ON RESPONSES TO ONE OR MORE PREVIOUS QUESTIONS

(75) Inventors: Juergen Sattler, Wiesloch (DE);
Joachim Gaffga, Wiesloch (DE);
Robert Viehmann, Waghausl (DE);
Frank Markert, Grossostheim (DE);
Steffen Riemann, St. Leon-Rot (DE);
Peng Gao, Shanghai (CN)

(73) Assignee: SAP AG, Waldorf (DE)

( * ) Notice: Subject to any disclaimer, the term of this patent is extended or adjusted under 35 U.S.C. 154(b) by 343 days.

(21) Appl. No.: 11/512,517

(22) Filed: Aug. 29, 2006

(65) Prior Publication Data
US 2008/0071718 A1    Mar. 20, 2008

(51) Int. Cl.
*G06N 5/00*    (2006.01)
*G06F 9/44*    (2006.01)
(52) U.S. Cl. .......................................... 706/46; 717/121
(58) Field of Classification Search ............ 706/46
See application file for complete search history.

(56) References Cited

U.S. PATENT DOCUMENTS

| 4,079,452 | A | 3/1978 | Larson et al. |
| 5,307,499 | A | 4/1994 | Yin |
| 5,459,868 | A | 10/1995 | Fong |
| 5,680,624 | A | 10/1997 | Ross |
| 5,754,845 | A | 5/1998 | White |
| 5,758,062 | A | 5/1998 | McMahon et al. |
| 5,857,102 | A | 1/1999 | McChesney et al. |
| 5,978,579 | A | 11/1999 | Buxton et al. |
| 6,044,461 | A | 3/2000 | Agha et al. |
| 6,128,730 | A | 10/2000 | Levine |
| 6,161,176 | A | 12/2000 | Hunter et al. |
| 6,189,139 | B1 | 2/2001 | Ladd |
| 6,230,305 | B1 | 5/2001 | Meares |
| 6,324,578 | B1 | 11/2001 | Cox et al. |
| 6,397,232 | B1 | 5/2002 | Cheng-Hung et al. |
| 6,449,624 | B1 | 9/2002 | Hammack et al. |
| 6,466,972 | B1 | 10/2002 | Paul et al. |

(Continued)

FOREIGN PATENT DOCUMENTS

JP    2004287972 A    10/2004

(Continued)

OTHER PUBLICATIONS

Liu et al., "A Knowledge-Based Approach to Requirements Analysis", 1995.*

(Continued)

*Primary Examiner* — Donald Sparks
*Assistant Examiner* — Nathan H Brown, Jr.
(74) *Attorney, Agent, or Firm* — Schwegman, Lundberg & Woessner, P.A.

(57) ABSTRACT

The present subject matter relates to configuring computer systems and, more particularly, to a computer system configuration deduction engine. Various systems, methods, and software are described. Some embodiments include determining a scoping question to ask as a function of a response to one or more other scoping questions, wherein possible responses to one or more scoping questions are associated with one or more application configuration packages. Some such embodiments further include selecting one or more application configuration packages for deployment as a function of one or more received scoping question responses.

17 Claims, 5 Drawing Sheets

U.S. PATENT DOCUMENTS

| | | | |
|---|---|---|---|
| 6,470,464 B2 | 10/2002 | Bertram et al. | |
| 6,513,045 B1 * | 1/2003 | Casey et al. | 707/104.1 |
| 6,523,027 B1 * | 2/2003 | Underwood | 707/4 |
| 6,538,668 B1 | 3/2003 | Ruberg et al. | |
| 6,539,372 B1 * | 3/2003 | Casey et al. | 707/3 |
| 6,728,877 B2 | 4/2004 | Mackin et al. | |
| 6,763,327 B1 | 7/2004 | Songer et al. | |
| 6,804,709 B2 | 10/2004 | Manjure et al. | |
| 7,032,114 B1 | 4/2006 | Moran | |
| 7,062,502 B1 | 6/2006 | Kesler | |
| 7,089,317 B2 | 8/2006 | Jeyaraman et al. | |
| 7,099,945 B2 | 8/2006 | Lugger et al. | |
| 7,181,731 B2 | 2/2007 | Pace et al. | |
| 7,206,827 B2 | 4/2007 | Viswanath et al. | |
| 7,228,326 B2 | 6/2007 | Srinivasan et al. | |
| 7,283,816 B2 | 10/2007 | Fok et al. | |
| 7,299,382 B2 | 11/2007 | Jorapur | |
| 7,337,317 B2 | 2/2008 | Meggitt et al. | |
| 7,360,211 B2 | 4/2008 | Hyden et al. | |
| 7,376,682 B2 | 5/2008 | Ramacher et al. | |
| 7,379,455 B2 | 5/2008 | Pickett | |
| 7,412,497 B2 | 8/2008 | Viswanath et al. | |
| 7,426,694 B2 | 9/2008 | Gross et al. | |
| 7,487,231 B2 | 2/2009 | Brown et al. | |
| 7,519,964 B1 | 4/2009 | Islam et al. | |
| 7,526,457 B2 | 4/2009 | Duevel et al. | |
| 7,540,014 B2 | 5/2009 | Vasishth et al. | |
| 7,590,669 B2 | 9/2009 | Yip et al. | |
| 7,593,124 B1 | 9/2009 | Sheng et al. | |
| 7,599,895 B2 | 10/2009 | Nugent | |
| 7,606,840 B2 | 10/2009 | Malik | |
| 7,609,651 B1 | 10/2009 | Mcbride et al. | |
| 7,610,582 B2 | 10/2009 | Becker et al. | |
| 7,617,256 B2 | 11/2009 | Mohamed et al. | |
| 7,640,542 B2 | 12/2009 | Herenyi et al. | |
| 7,644,432 B2 | 1/2010 | Patrick et al. | |
| 7,657,887 B2 | 2/2010 | Kothandaraman et al. | |
| 7,665,082 B2 | 2/2010 | Wyatt et al. | |
| 7,685,577 B2 | 3/2010 | Pace et al. | |
| 7,716,634 B2 | 5/2010 | Ross et al. | |
| 7,725,877 B2 | 5/2010 | Andrade et al. | |
| 7,739,657 B2 | 6/2010 | Rolfs | |
| 7,823,124 B2 | 10/2010 | Sattler et al. | |
| 7,827,528 B2 | 11/2010 | Sattler et al. | |
| 7,831,568 B2 | 11/2010 | Sattler et al. | |
| 7,831,637 B2 | 11/2010 | Sattler et al. | |
| 2001/0044834 A1 | 11/2001 | Bradshaw et al. | |
| 2001/0054091 A1 | 12/2001 | Lenz et al. | |
| 2002/0026572 A1 | 2/2002 | Joory | |
| 2002/0095663 A1 | 7/2002 | Joory | |
| 2002/0104097 A1 | 8/2002 | Jerding et al. | |
| 2002/0116373 A1 | 8/2002 | Nishikawa et al. | |
| 2002/0147784 A1 | 10/2002 | Gold et al. | |
| 2002/0156947 A1 | 10/2002 | Nishio | |
| 2003/0005411 A1 | 1/2003 | Gerken | |
| 2003/0023963 A1 | 1/2003 | Birkholz et al. | |
| 2003/0120780 A1 | 6/2003 | Zhu et al. | |
| 2003/0135842 A1 | 7/2003 | Frey et al. | |
| 2003/0227392 A1 | 12/2003 | Ebert et al. | |
| 2004/0019669 A1 | 1/2004 | Viswanath et al. | |
| 2004/0019670 A1 | 1/2004 | Viswanath et al. | |
| 2004/0031030 A1 | 2/2004 | Kidder et al. | |
| 2004/0060047 A1 | 3/2004 | Talati et al. | |
| 2004/0111417 A1 | 6/2004 | Goto et al. | |
| 2004/0176996 A1 | 9/2004 | Powers et al. | |
| 2004/0186927 A1 | 9/2004 | Eryurek et al. | |
| 2004/0268342 A1 | 12/2004 | Hyden et al. | |
| 2005/0007964 A1 | 1/2005 | Falco et al. | |
| 2005/0044215 A1 | 2/2005 | Cohen et al. | |
| 2005/0044546 A1 | 2/2005 | Niebling et al. | |
| 2005/0080801 A1 | 4/2005 | Kothandaraman et al. | |
| 2005/0086195 A1 | 4/2005 | Tan et al. | |
| 2005/0108219 A1 | 5/2005 | De La Huerga | |
| 2005/0138558 A1 | 6/2005 | Duevel et al. | |
| 2005/0144474 A1 | 6/2005 | Takala et al. | |
| 2005/0160419 A1 | 7/2005 | Alam et al. | |
| 2005/0188422 A1 | 8/2005 | Jooste | |
| 2005/0193103 A1 | 9/2005 | Drabik | |
| 2005/0262076 A1 | 11/2005 | Voskuil | |
| 2005/0262499 A1 | 11/2005 | Read | |
| 2005/0268282 A1 | 12/2005 | Laird | |
| 2005/0278202 A1 | 12/2005 | Broomhall et al. | |
| 2005/0278280 A1 | 12/2005 | Semerdzhiev et al. | |
| 2006/0047793 A1 | 3/2006 | Agrawal et al. | |
| 2006/0173857 A1 | 8/2006 | Jackson | |
| 2006/0184917 A1 | 8/2006 | Troan et al. | |
| 2006/0184926 A1 | 8/2006 | Or et al. | |
| 2006/0224637 A1 | 10/2006 | Wald | |
| 2006/0234698 A1 | 10/2006 | Fok et al. | |
| 2006/0242697 A1 | 10/2006 | Takemura | |
| 2006/0248450 A1 | 11/2006 | Wittenberg et al. | |
| 2006/0253588 A1 | 11/2006 | Gao et al. | |
| 2007/0016591 A1 | 1/2007 | Beadles et al. | |
| 2007/0025704 A1 | 2/2007 | Tsukazaki et al. | |
| 2007/0074203 A1 | 3/2007 | Curtis et al. | |
| 2007/0093926 A1 | 4/2007 | D. Braun et al. | |
| 2007/0157185 A1 | 7/2007 | Semerdzhiev et al. | |
| 2007/0168065 A1 | 7/2007 | Nixon et al. | |
| 2007/0198437 A1 | 8/2007 | Eisner et al. | |
| 2007/0234274 A1 | 10/2007 | Ross et al. | |
| 2007/0257715 A1 | 11/2007 | Semerdzhiev et al. | |
| 2008/0059474 A1 | 3/2008 | Lim | |
| 2008/0059490 A1 | 3/2008 | Sattler et al. | |
| 2008/0059537 A1 | 3/2008 | Sattler et al. | |
| 2008/0059630 A1 | 3/2008 | Sattler et al. | |
| 2008/0071555 A1 | 3/2008 | Sattler et al. | |
| 2008/0071828 A1 | 3/2008 | Sattler et al. | |
| 2008/0071839 A1 | 3/2008 | Sattler et al. | |
| 2008/0082517 A1 | 4/2008 | Sattler et al. | |
| 2008/0126375 A1 | 5/2008 | Sattler et al. | |
| 2008/0126448 A1 | 5/2008 | Sattler et al. | |
| 2008/0127082 A1 | 5/2008 | Birimisa et al. | |
| 2008/0127084 A1 | 5/2008 | Sattler et al. | |
| 2008/0127085 A1 | 5/2008 | Sattler et al. | |
| 2008/0127086 A1 | 5/2008 | Sattler et al. | |
| 2008/0127123 A1 | 5/2008 | Sattler et al. | |
| 2008/0195579 A1 | 8/2008 | Kennis et al. | |
| 2009/0157455 A1 | 6/2009 | Kuo et al. | |
| 2010/0153443 A1 | 6/2010 | Gaffga et al. | |
| 2010/0153468 A1 | 6/2010 | Lange et al. | |

FOREIGN PATENT DOCUMENTS

| | | |
|---|---|---|
| WO | WO-2004114130 A2 | 12/2004 |
| WO | WO-2005045670 A1 | 5/2005 |

OTHER PUBLICATIONS

Gu et al. (Gu), Component Retrieval Using Conversational Case-Based Reasoning, IEA-AIE, Annecy, France, Jun. 27-30, 2006.*

Park, Software retrieval by samples using concept analysis, Journal of Systems and Software 54, pp. 179-183, 2000.*

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Written Opinion Mailed Mar. 17, 2008", 8 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/00751, International Search Report mailed Jan. 24, 2008", 8 pgs.

"International Application Serial No. PCT/EP2007/007515, Written Opinion mailed Jan. 24, 2008", 12 pgs.

"International Application Serial No. PCT/EP2007/007460, International Search Report Nov. 2, 2007", 5 pgs.

"International Application Serial No. PCT/EP2007/007460, Written OpinionNov. 2, 2007", 7 pgs.

"International Application Serial No. PCT/EP2007/007461, International Search Report Nov. 26, 2007", 7 pgs.

"International Application Serial No. PCT/EP2007/007462, Partial International Search Report Dec. 27, 2007", 8 pgs.

"International Application Serial No. PCT/EP2007/007490, International Search Report Oct. 26, 2007", 4 pgs.
"International Application Serial No. PCT/EP2007/007491, International Search Report Oct. 22, 2007", 5 pgs.
"International Application Serial No. PCT/EP2007/007491, Written Opinion Oct. 22, 2007", 6 pgs.
"International Application Serial No. PCT/EP2007/007515, International Search Report Nov. 12, 2007", 8 pgs.
Indigorose, "Setup Factory", *User's Guide IndigoRose Software Design No. 2*, (Mar. 1998),82 pages.
"U.S. Appl. No. 11/512,443, Response filed Oct. 9, 2008 to Non-Final Office Action mailed Jul. 9, 2008", 11 pgs.
"U.S. Appl. No. 11/512,443, Non-Final Office Action mailed Jul. 9, 2008", 17 pgs.
"U.S. Appl. No. 11/512,519 response filed Nov. 11, 2008 to Non-Final Office Action mailed Sep. 11, 2008", 15 pgs.
"U.S. Appl. No. 11/512,519, Non-FinalOffice Action mailed Sep. 11, 2008", 14 pgs.
"U.S. Appl. No. 11/512,609, Non Final Office Action mailed on Jun. 19, 2008", 9 pgs.
"U.S. Appl. No. 11/512,609, Response filed Sep. 19, 2008 to Non-Final Office Action mailed Jun. 19, 2008", 8 pgs.
"U.S. Appl. No. 11/512,609 Final Office Action mailed Dec. 8, 2008", 14 pgs.
"U.S. Appl. No. 11/512,884, Non-Final Office Action Mailed Jul. 29, 2008", 12 pgs.
"U.S. Appl. No. 11/512,884 Final Office Action mailed Dec. 19, 2008", 13 pgs.
"U.S. Appl. No. 11/512,886 Non-Final Office Action mailed Dec. 26, 2008", 15 pgs.
"U.S. Appl. No. 11/512,884, Response filed Sep. 23, 2008 to Non-Final Office Action mailed Jul. 29, 2008", 17 pgs.
"U.S. Appl. No. 11/512,443, Non-Final Office Action mailed Jun. 26, 2009", 14 pgs.
"U.S. Appl. No. 11/512,516, Non-Final Office Action mailed Jul. 10, 2009", 17 Pgs.
"U.S. Appl. No. 11/512,886, Final Office Action mailed Jun. 24, 2009", 11 pgs.
"U.S. Appl. No. 11/512,442, Non Final Office Action mailed Oct. 1, 2009", 15 pgs.
"U.S. Appl. No. 11/512,443, Examiner Interview Summary mailed Oct. 7, 2009", 4 pgs.
"U.S. Appl. No. 11/512,443, Response filed Apr. 3, 2009 to Final Office Action mailed Feb. 6, 2009", 13 pgs.
"U.S. Appl. No. 11/512,443, Response filed Sep. 29, 2009 to Non Final Office Action mailed Jun. 26, 2009", 16 pgs.
"U.S. Appl. No. 11/512,516, Response filed Oct. 9, 2009 to Non Final Office Action mailed Jul. 10, 2009", 9 pgs.
"U.S. Appl. No. 11/512,520, Response filed Oct. 22, 2009 to Non Final Office Action mailed Jul. 22, 2009", 13 pgs.
"U.S. Appl. No. 11/512,609, Final Office Action mailed Nov. 20, 2009", 15 pgs.
"U.S. Appl. No. 11/512,886, Examiner Interview Summary mailed Sep. 29, 2009", 2 pgs.
"European Application Serial No. 09012347.2, Extended European Search Report mailed Nov. 26, 2009", 5 pgs.
"U.S. Appl. No. 11/512,886, Notice of Allowance mailed Dec. 24, 2009", 9 Pgs.
"U.S. Appl. No. 11/512,442, Final Office Action mailed Apr. 21, 2010", 13 pgs.
"U.S. Appl. No. 11/512,443, Response filed Apr. 22, 2010 to Final Office Action mailed Jan. 22, 2010", 12 pgs.
"U.S. Appl. No. 11/512,516, Response filed Apr. 30, 2010 to Final Office Action mailed Mar. 5, 2010", 9 pgs.
"U.S. Appl. No. 11/512,608, Non-Final Office Action mailed May 12, 2010", 12 Pages.
"U.S. Appl. No. 11/512,457, Non-Final Office Action mailed May 13, 2010", 11 pages.
Krintz, Chandra J., "Reducing load delay to improve performance of Internet-computing programs", *University of California, San Diego*, (2001), 225 pgs.
"U.S. Appl. No. 11/512,441, Non-Final Office Action mailed Jun. 21, 2010", 8 pgs.
"U.S. Appl. No. 11/512,442, Response filed Jun. 21, 2010 to Final Office Action mailed Apr. 21, 2010", 9 pgs.
"U.S. Appl. No. 11/512,520, Notice of Allowance mailed Jun. 15, 2010", 6 pgs.
"U.S. Appl. No. 11/512,440, Non-Final Office Action mailed Jun. 17, 2010", 14 pgs.
"U.S. Appl. No. 11/511,357, Non-Final Office Action mailed Jul. 2, 2010", 11 pgs.
"U.S. Appl. No. 11/512,440, Notice of Allowance mailed Nov. 12, 2010.", 14 pgs.
"U.S. Appl. No. 11/512,440, Response filed Oct. 18, 2010 to Non Final Office Action mailed Jun. 17, 2010", 11 pgs.
"U.S. Appl. No. 11/512,441, Response filed Sep. 21, 2010 to Non Final Office Action mailed Jun. 21, 2010", 8 pgs.
"U.S. Appl. No. 11/512,443, Notice of Allowance mailed Sep. 21, 2010", 17 pgs.
"U.S. Appl. No. 11/512,457, Notice of Allowance mailed Aug. 13, 2010", 13 pgs.
"U.S. Appl. No. 11/512,457, Notice of Allowance mailed Sep. 17, 2010", 7 pgs.
"U.S. Appl. No. 11/512,457, Response filed Aug. 5, 2010 to Non Final Office Action mailed Jul. 8, 2010", 10 pgs.
"U.S. Appl. No. 11/512,516, Non-Final Office Action mailed Jul. 8, 2010", 20 pgs.
"U.S. Appl. No. 11/512,516, Response filed Oct. 8, 2010 to Non Final Office Action mailed Jul. 8, 2010", 11 pgs.
"U.S. Appl. No. 11/512,518, Final Office Action mailed Oct. 15, 2010", 15 pgs.
"U.S. Appl. No. 11/512,518, Response filed Aug. 24, 2010 to Non Final Office Action mailed May 27, 2010", 10 pgs.
"U.S. Appl. No. 11/512,520 Notice of Allowance mailed Sep. 29, 2010", 6 pgs.
"U.S. Appl. No. 11/512,608 Notice of Allowance mailed Sep. 8, 2010", 8 pgs.
"U.S. Appl. No. 11/512,608 Notice of Allowance mailed Aug. 13, 2010", 9 pgs.
"U.S. Appl. No. 11/512,608, Response filed Aug. 5, 2010 to Non Final Office Action mailed May 12, 2010", 10 pgs.
Bellissard, Luc, et al., "Component-based Programming and Application Management with Olan, Proceedings of Workshop on Distributed Computing", Retrieved on [Jun. 15, 2010] Retrieved from the Internet: URL<http://www.springerlink.com/contenUf2g8rl4083393124/fulitext.pdf>, (1995).
Brown, Wanda Jones, et al., ""Configuration Management Plan for the Science Data Processing System"", Upper Marlboro, Maryland, (Apr. 2001).
Dotoli, et al., "A decision support system for the supply chain configuration", IEEE, (Oct. 8, 2003), 6 pgs.
Ganguly, et al., "Reducing Complexity of Software Deployment with Delta Configuration", IEEE, (May 21, 2007).
Kahl, Fredrik, et al., "Critical configurations for n-view projective reconstruction", IEEE, (Dec. 12, 2001), 6 pgs.
Sloane, et al., "Modeling Deployment and Configuration", IEEE.
Virgilo, "A Rule-based Approach to Content Delivery Adaptation in Web Information Systems", Proc. 7th International Conference on Mobile Data Management, IEEE, (May 12, 2006), 4 pgs.
Ying Li, et al., "Modeling and Verifying Configuration in Service Deployment", IEEE.

* cited by examiner

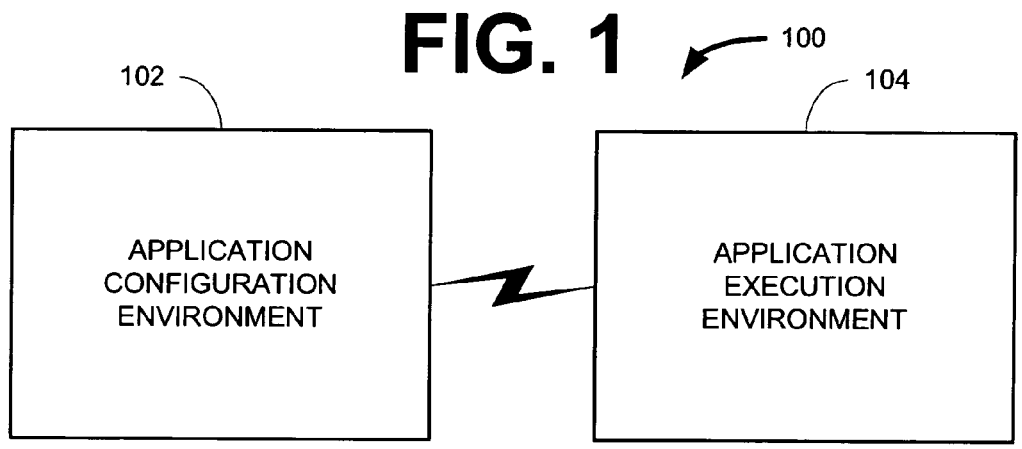
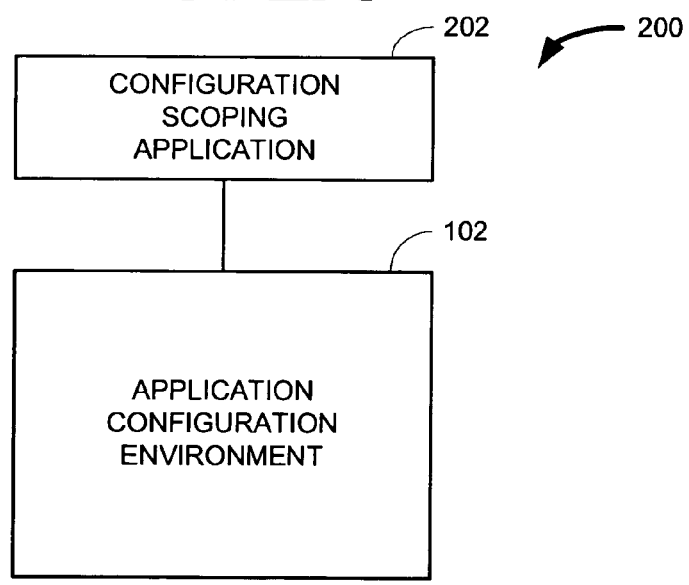

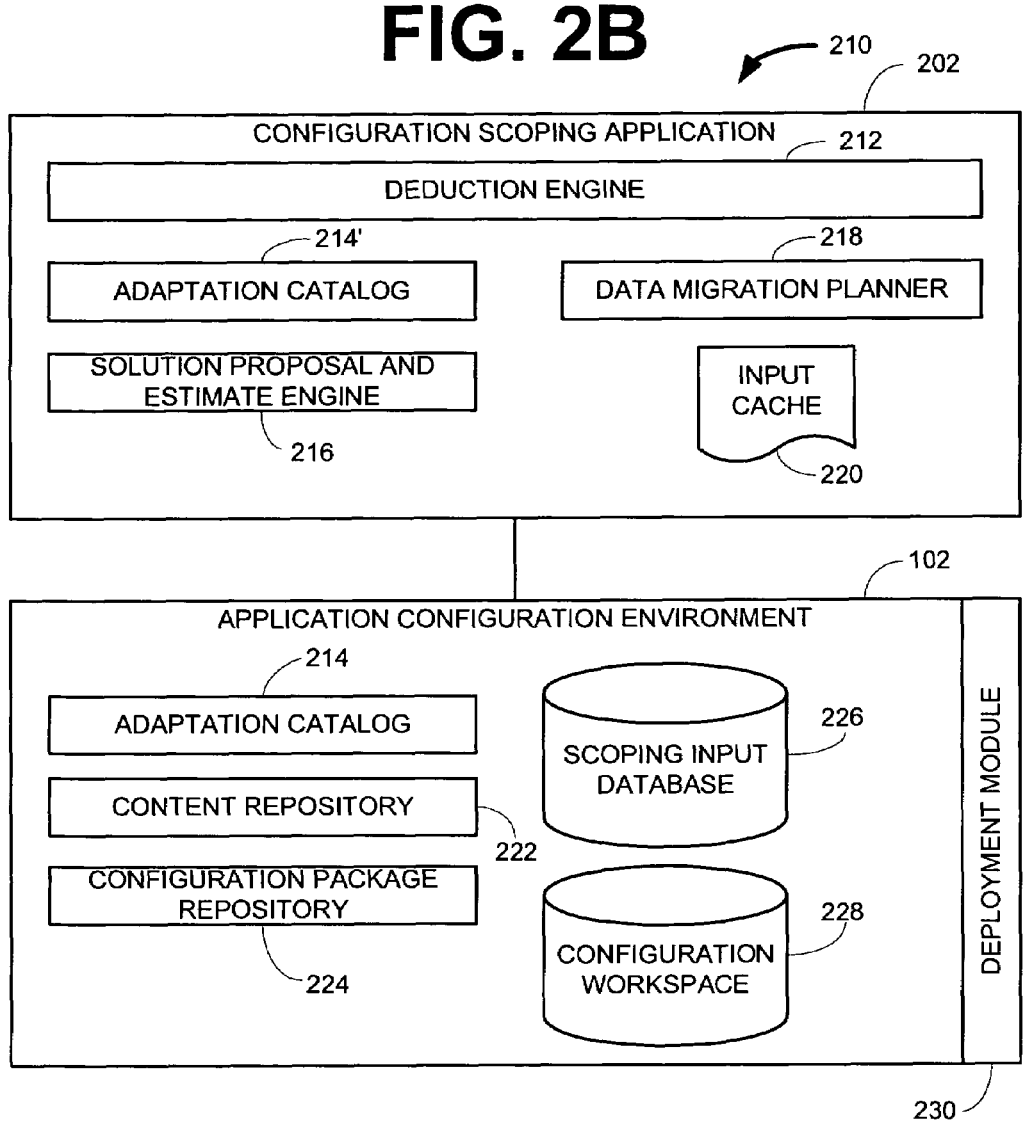

DEDUCTION ENGINE TO DETERMINE WHAT CONFIGURATION MANAGEMENT SCOPING QUESTIONS TO ASK A USER BASED ON RESPONSES TO ONE OR MORE PREVIOUS QUESTIONS

TECHNICAL FIELD

The present subject matter relates to configuring computer systems and, more particularly, to a computer system configuration deduction engine.

BACKGROUND INFORMATION

Configuring large software systems, such as Enterprise Resource Planning ("ERP") systems, typically is a large, complex task. Configuring such systems often involves the efforts of many highly trained individuals, any one of which may not know what the others are configuring. This may result in conflicting configuration settings that may not be discovered until after the system has gone live, or if already live, until system performance is adversely affected. Thus, the time and expense of configuring and maintaining large software systems can be significant. At the same time, an inconsistent configuration also can be costly to an enterprise using such a system if system performance is adversely affected.

BRIEF DESCRIPTION OF THE DRAWINGS

FIG. 1 is a block diagram of a system according to an example embodiment.

FIG. 2A is a block diagram of a system according to an example embodiment.

FIG. 2B is a block diagram of a system according to an example embodiment.

DETAILED DESCRIPTION

Figure 3:
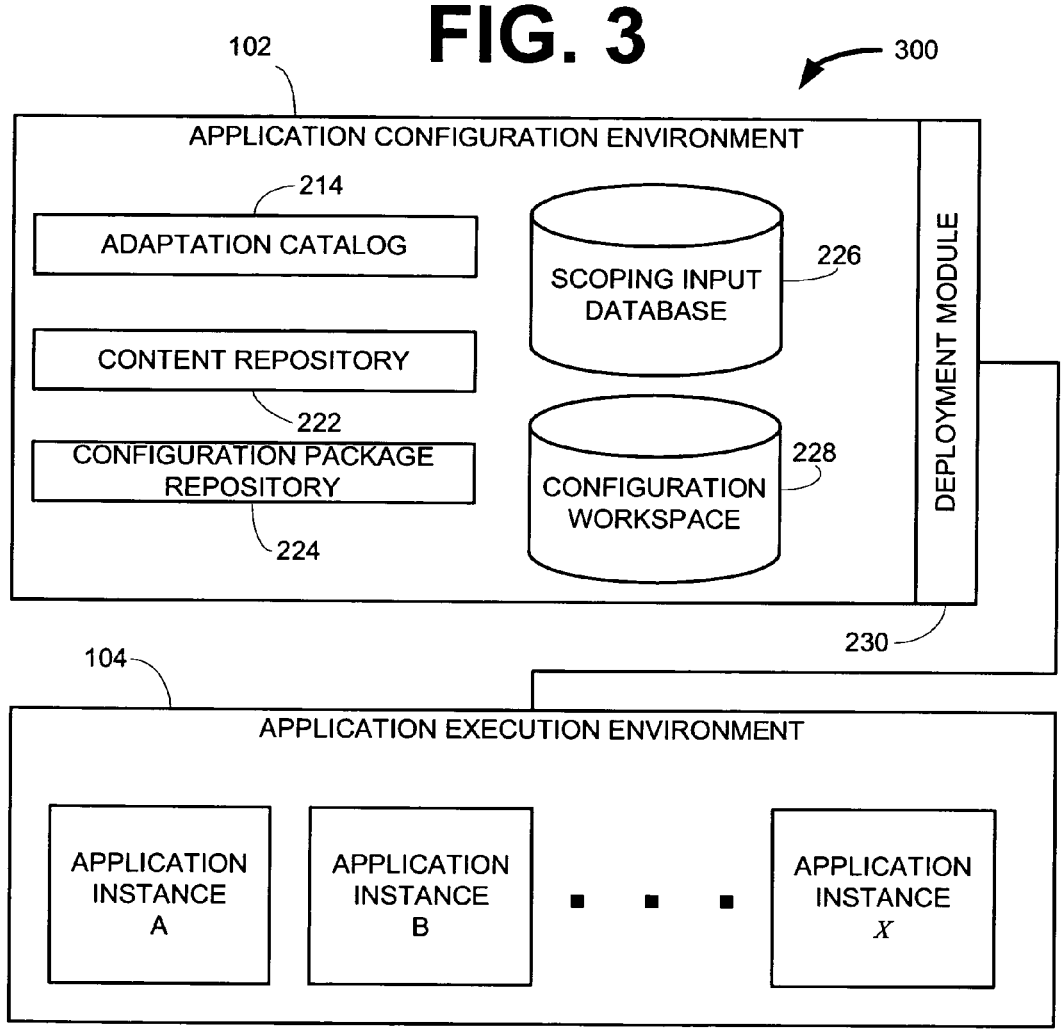
FIG. 3 is a block diagram of a system according to an example embodiment.

To reduce the time, cost, and complexity of configuring large software systems, such as Enterprise Resource Planning ("ERP") systems, some embodiments of the following subject matter provide a deduction engine that operates to provide a dynamic question set to aid in configuration of such systems. The questions in such question sets typically are tied to configuration settings. In some of such embodiments, the deduction engine executes to determine what questions to ask a user based on responses to one or more previous questions. As a user answers questions, configuration settings are determined. Some of such determinations specify not to ask one or more of a universe of possible questions because an answer to a previous question eliminated the need to ask some of the one or more questions. As a result, a large software system can be configured quickly than if more of the universe of possible questions were asked.

Further, in instances such as where the software system is a business oriented system, a person with knowledge of the business can answer the configuration-setting questions, thus removing, or at least greatly reducing, the need for highly trained system configuration personnel. Further, using business personnel to answer the configuration questions may enable the system to be configured in the context the business in which the system will be used.

Additionally, in a system sales environment, a sales person can use a sales-related question set to quickly obtain answers to a smaller universe of configuration sales-based questions from a sales lead. The answers to this smaller universe of sales-based questions allow the sales person to create a demonstration instance of the system configured according to the sales-based question answers. Such a demonstration instance may not be fully configured to the needs of the sales lead, but the demonstration instance will quickly give the sales lead a chance to interact with the system configured in the context of the sales lead's business.

In some further embodiments, the deduction engine can operate to evaluate subsequent configuration question answer changes or configuration setting changes, thus allowing a configured system to be modified while ensuring system integrity by avoiding conflicting configuration settings.

Further, if the questions are answered or the configuration changes are modified concurrently by more than one analyst, administrator, or other individual or process, the deduction engine, in some embodiments, provides notices of potential or actual conflicts. In some embodiments, the deduction engine can even prevent conflicting configuration settings.

These embodiments, and others, are described in greater detail below. In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, electrical, or other changes may be made without departing from the scope of the inventive subject matter. Such embodiments of the inventive subject matter may be referred to, individually and/or collectively, in the present application by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described in the present application are implemented in hardware, software or a combination of software and hardware in one or more embodiments. The software comprises computer executable instructions stored on computer readable media such as memory or other type of storage devices. The term "computer readable media" is also used to represent carrier waves on which the software is transmitted. Further, such functions correspond to modules, which may include one or a combination of software, hardware, or firmware. Multiple functions may be performed in one or more modules as desired, and the embodiments described are merely examples. The software may be executed on a digital signal processor, ASIC, microprocessor, or other type of processor operating on a system, such as a personal computer, server, a router, or other device capable of processing data including devices interconnected by a network.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 includes an application configuration environment 102 and an application execution environment 104.

The application configuration environment 102 is a system 100 environment within which an application can be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration can then be deployed to the application execution environment 104. This deployment can occur to one or more separate instances of the application in the application execution environment 104. Although only a single application execution environment 104 is illustrated, multiple application execution environments 104 can exist, and the deployment can be made to one or more of the multiple application execution environments 104.

FIG. 2A is a block diagram of a system 200 according to an example embodiment. The system 200 includes a configuration scoping application 202 and the application configuration environment 102.

The configuration scoping application 202 typically is a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions are linked to one of many adaptation catalog entries. The adaptation catalog entries include a representation of all of the solution capabilities of an application to be configured, and eventually executed. In some embodiments, the solution capabilities are hierarchically divided into areas, packages, topics, and options. There may be multiple areas and each area may have multiple packages. Each package may have multiple topics and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, each scoping question may be linked to an adaptation catalog entry. An adaptation catalog entry further includes a rule. These rules typically model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule can also specify that other packages, topics, and options and the corresponding solution capabilities are excluded.

Thus, when a user answers scoping questions, the configuration of the application is being performed. Further, when a question is answered that is associated with an adaptation catalog entry having a rule that excludes another area, package, topic, or option, that rule may be applied to eliminate questions from consideration. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults, the question may be skipped without adversely affecting the application configuration. FIG. 2B provides further detail of some embodiments of the configuration scoping application 202 in conjunction with an embodiment of the application configuration environment 102.

FIG. 2B is a block diagram of a system 210 according to an example embodiment. The system 210 includes the configuration scoping application 202 and the application configuration environment 102.

The configuration scoping application 202, in some embodiments, includes a deduction engine 212, and an adaptation catalog 214'. In this embodiment, the configuration scoping application 202 further typically includes a solution proposal and estimate engine 216, a data migration planner 218, and an input cache 220.

The application configuration environment 102, in some embodiments, includes an adaptation catalog 214, a content repository 222, and a configuration package repository 224. In some such embodiments, the application configuration environment further includes a scoping input database 226, a configuration workspace 118, and a deployment module 230.

The adaptation catalog 214 may include a representation of all of the solution capabilities of an application to be configured, and eventually executed. Each capability of an application to be configured is identified in an adaptation catalog 214 entry. The adaptation catalog 214 entries each may be identified as an area, package, topic, or option and may be organized in a hierarchy with a child identifying the parent. An example hierarchy is a "General Ledger" capability, which in some embodiments typically is a package having two topics, "cash based" and "accrual based" which may be two application capabilities within the "General Ledger" capability.

The adaptation catalog 214 entries may further include scoping questions directed toward obtaining scoping information to determine what areas, packages, topics, and options are relevant to the user's needs. Additionally, the adaptation catalog entries typically include rules, the application of which can require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be enabled and disabled in the application when deployed.

In some embodiments, rules and entries in the adaptation catalog can be linked to a configuration package that exists in the configuration package repository 224 within the application configuration environment 102. A configuration package includes one or more configuration settings that enable or disable functionality of the application when deployed.

In one embodiment, rules are applied by the deduction engine 212 of the configuration scoping application 202. The configuration scoping application 202 typically presents a user interface that requests answers to questions that may be identified by the deduction engine 212 based on the adaptation catalog 214'. The adaptation catalog 214' typically is a copy of the adaptation catalog 214 of the application configuration environment 102. When an answer is received by the configuration scoping application 202 through the user interface, the answer may be stored in the input cache 220 of the configuration scoping application 202. The deduction engine 212 then typically applies the rule associated with the adaptation catalog 214' entry of the question asked to the received answer. Through the application of the rule, in view of answers already received and rules already applied, the deduction engine 212 may be configured to identify a next question to ask. The identified question typically is then presented to the user through the user interface. This process may be configured to continue until either all of the questions have been asked or the user is out of time, or the user otherwise chooses to stop. If questions remain that have not been answered, the process typically can be continued at a later time or rules may be configured to specify default areas, packages, topics, and options in order to supply enough information to allow deployment of the application in a functional form.

In some embodiments, the configuration scoping application 218 further includes a data migration planner 218. In such embodiments, one or more additional scoping questions typically can be asked. These additional scoping questions may be directed toward obtaining information from the user about legacy systems and how data is stored within them. In some embodiments, the questions simply ask what systems are currently in use. In other embodiments, the questions are more detailed to obtain information such as what type of database is a system utilizing and what type of customization has been made or custom systems developed. The data migration planner 218 typically uses the answers to these additional questions to propose a data migration plan to the new application.

In some embodiments, the configuration scoping application 202 includes a solution proposal and estimate engine 216. The solution proposal and estimate engine 216 may be used in a sales situation. For example, if a sales person is discussing with a sales lead what a certain application product can do for the sales lead, the sales person typically can utilize the configuration scoping application 202 to obtain information about the needs of the sales lead via the scoping questions. The scoping question answers may then be utilized by the solution proposal and estimate engine 216 to make an initial determination of what will be involved if the sales lead decides to purchase the application. The solution proposal and estimate engine 216 normally is configured to output information for the sales person to make several determinations, such as the size of effort necessary to implement or transition to the application from legacy system, the cost involved, and cost. In some embodiments, the output of the solution proposal and estimate engine 216 outputs one or more of an implementation cost estimate, an application solution proposal, and a recommended project roadmap. In some embodiments, the solution proposal and estimate engine 216 outputs a proposal for one or more other options, application descriptions, sales literature, benefit statements of using the application, and addition documents, such as a proposal of key performance indicators the application can monitor to assist in managing the application or enterprise of the sales lead.

After the scoping question have been answered, the answers, and any other information obtained from a sales lead or other user of the configuration scoping application 202, the information typically is uploaded to the application configuration environment. However, in embodiments, where the configuration scoping application 202 executes on the same computing device as the application configuration environment 202, the scoping question answers and other information may be stored directly to the application configuration environment 102.

When the configuration question answers and other information is uploaded, or otherwise stored to the application environment 102, the scoping question answers are stored to the scoping input database 226. The scoping question answers, in some instances, will be referred to interchangeably as the "scoping information."

After the scoping information is within the scoping input database 226, a typical process within the application configuration environment 102 can execute to begin configuring an application in the configuration workspace 228. The configuration workspace may include a set of configuration tables that mirrors, at least in part, the configuration tables of the application.

The process that configures the application typically determines one or more configuration packages to instantiate in the configuration workspace 228. Configuration packages, in some embodiments, include one or a set of configuration settings to enable or disable certain capabilities of the application. Configuration packages, as mentioned above, can be linked to adaptation catalog 214 entries and rules associated with adaptation catalog entries. Thus, the process that configures the application in the configuration workspace 228 typically queries the scoping information in the scoping input database 226 to identify configuration packages to instantiate.

In some embodiments, demonstration data exists to facilitate the instantiation of a demonstration instance of the application for a sales lead, training session, or other purpose. The demonstration data, in some embodiments, is linked to one or more configuration packages from the configuration package repository 224. The demonstration data typically exists in the content repository 222 so that it can be copied into a set of application tables. These tables may hold such data transactional data, operational data, master data, or other data that can exist in the application when the application is ready for execution or is executed. In some embodiments, the demonstration data is copied directly to application tables in the application execution environment 104 as illustrated in FIG. 1.

Once the demonstration data is copied to the configuration workspace 228, that data may be fine-tuned to more closely match the intended use of the demonstration data. For example, the system may be configured to that a sales person, or other individual, can fine-tune demonstration data values to more closely match a sales lead's expectations of the application. Such fine tuning may include modifying sales order documents in the demonstration data to include a name, address, and logo of the sales lead's enterprise, or other similar modifications to the demonstration data.

After the application has been configured in the configuration workspace and the demonstration data, if any, is ready, the configuration typically is deployed by the deployment module 230. The deployment module 230 may be configured to deploy configuration settings to a baseline application that has already been instantiated in an application execution environment. In some embodiments, the deployment module includes a configuration setting deployment process, an activation process, and a data deployment process. The configuration setting deployment process typically copies configuration settings from configuration tables in the configuration workspace 228. The data deployment process may be configured to execute if there is demonstration data in the configuration workspace 228. If there is demonstration data, the data typically is copied from the configuration workspace 228 to application tables in the application execution environment. Some embodiments further utilize the activation process.

The activation process, in some of such embodiments, executes to activate the application in the application execution environment after it has been successfully deployed. In some instances, the activation process requires an activation key, message, code, or other authorization from an activation authority to activate the application. The activation authority may be configured to include one or more of a number of individuals or entities. An example of an activation authority is an entity selling the application to be activated. This activation functionality requiring an activation key or other mechanism can be utilized for several purposes. Some of such purposes typically include allowing the entity selling the application to ensure the application is properly configured, has passed certain testing necessary for the entity to ensure it will meet guaranteed service level agreements or objectives, for billing purposes, or other purposes that can benefit from such an activation process.

In some embodiments, the deployment module 230 further includes a delta deployment process that is relevant only after an application has already been deployed. When an application is deployed, or subsequently modified, the scoping information in the scoping input database 226 typically is updated. In some embodiments, enables tracking of a current configuration of a deployed application. In embodiments including the delta deployment process, the scoping information typically is further tracked on a historical basis to at least allow a view of a current configuration and a modified configuration not yet deployed, if applicable. The delta deployment process then typically uses that historical tracking of the application configuration to identify changes between the current application configuration and the modified configuration not yet deployed. The delta deployment process then normally only deploys the changes to the application configuration.

FIG. 3 is a block diagram of a system 300 according to an example embodiment. The system 300 includes the application configuration environment 102 as discussed above with regard to FIG. 1, FIG. 2A, and FIG. 2B. The system 300 further includes an application execution environment 104.

The application execution environment 104 is a data processing environment within which an application, or an application to be deployed, can execute. When deploying an application, the deployment module 230 needs to know what application execution environment 104 and what application instance within that environment to deploy to. In embodiments including only one application execution environment 104, the application execution environment 104 may already be known. Similarly, in an application execution environment including only a single application instance, the instance may already be known.

Each instance of the application (i.e., application instances A, B, . . . X) typically includes a set of identical configuration tables which can include distinct configuration settings from one another. In some embodiments, multiple instances of the application exist to provide a development instance, a test instance, and a production instance. In such embodiments where there are multiple application instances, the deployment module 230 may be configured to deploy the configuration settings from one of the application instances in the application execution environment 104 to another application in the same or another application execution environment 104. Although the deployment module 230 is illustrated as being a part of the application configuration environment 102, the deployment module 230, in other embodiments, can be a standalone application or a part of another application or process.

Figure 4:
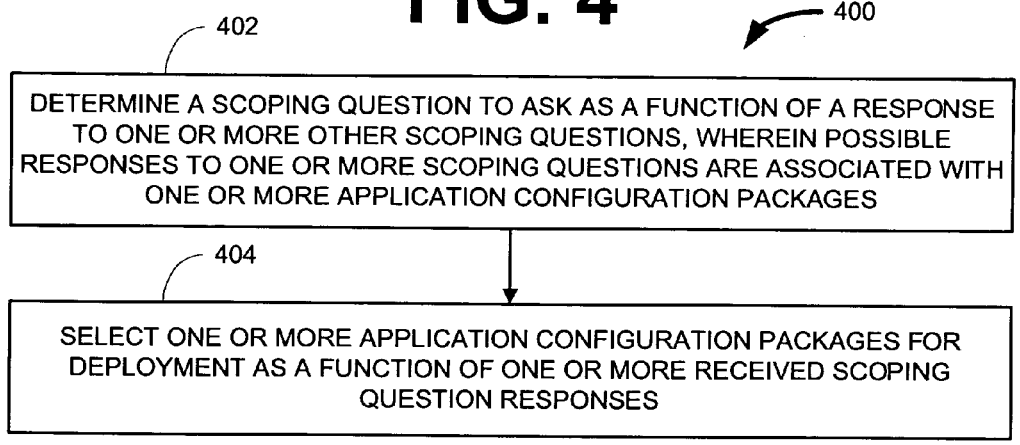
FIG. 4 is a flow diagram of a method according to an example embodiment.

FIG. 4 is a flow diagram of a method 400 according to an example embodiment. The example method 400 includes determining a scoping question to ask as a function of a response to one or more other scoping questions. In some embodiments, possible responses to one or more scoping questions are associated with one or more application configuration packages 402. The method 400 may further include selecting one or more application configuration packages for deployment as a function of one or more received scoping question responses 404. In some embodiments, an application configuration package includes predefined content, such as demonstration data.

In some embodiments, a configuration package is selected for deployment as a function of another configuration package previously selected as a function of one or more received scoping question responses a configuration package selection constraint, or rule, of the first configuration package. In some embodiments, a configuration package selection constraint can require or exclude selection of an application configuration package. Where a first application configuration package selection constraint requires selection of a second application configuration package, the first application configuration package, in some embodiments, leverages functionality of the second application configuration package.

Figure 5:
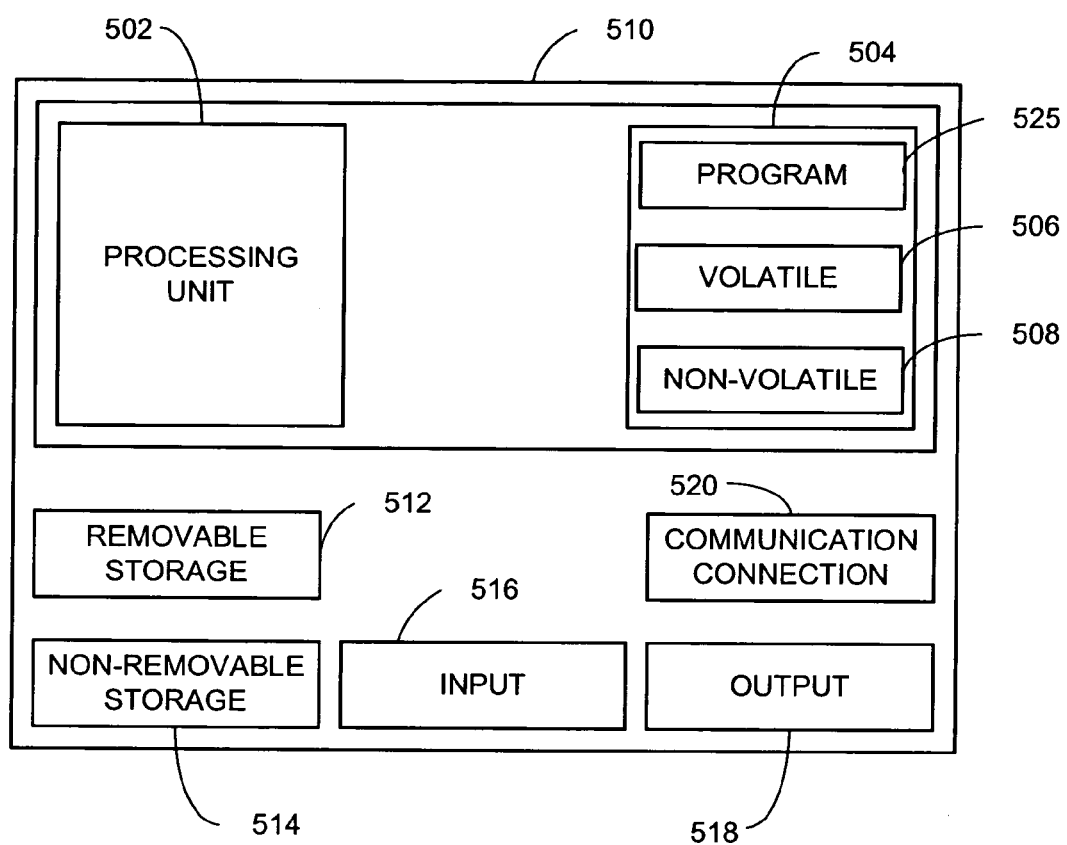
FIG. 5 is a block diagram of a computing system according to an example embodiment.

FIG. 5 is a block diagram of a computing system according to an example embodiment. In one embodiment, multiple such computer systems are utilized in a distributed network to implement multiple components in a transaction-based environment. An object-oriented architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage typically includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. The term "computer readable medium" is also used to represent carrier waves on which the software is transmitted. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
    determining, on a processor of a computer performing the method, a scoping question to ask as a function of a response to at least one other scoping question, wherein possible scoping question responses are associated with application configuration packages for an application to be configured, each application configuration package including configuration setting values to configure the application;
    selecting at least one application configuration package for deployment as a function of received scoping question responses;
    storing, on a data storage device, the received scoping question responses and the selected application configuration packages;
    wherein an application configuration package includes predefined content; and
    deploying the selected application configuration packages to a baseline application in an application execution environment.

2. The method of claim 1, wherein predefined content includes application demonstration data.

3. The method of claim 1, wherein a second configuration package is further selected as a function of:
    a first configuration package selected as a function of the received scoping question responses; and
    a configuration package selection constraint of the first configuration package.

4. The method of claim 1, wherein a second application configuration package is not selected for deployment as a function of an exclusion constraint associated with a first selected application configuration package.

5. The method of claim 3, wherein the configuration package selection constraint of the first configuration package requires selection of the second application package.

6. The method of claim 3, wherein application functionality associated with the first application configuration package leverages functionality of the second application configuration package.

7. A non-transitory machine-readable storage medium, with encoded instructions stored thereon, which when executed by a processor of a machine, cause the machine to:
    determine a scoping question to ask as a function of a response to at least one other scoping question, wherein possible scoping question responses are associated with at least one application configuration package for an application to be configured, each configuration package including configuration setting values to configure the application;
    select at least one application configuration package for deployment as a function of received scoping question responses;
    store the received scoping question responses and the selected application configuration packages;
    wherein an application configuration package includes predefined content; and
    deploying the selected application configuration packages to a baseline application in an application execution environment.

8. The non-transitory machine-readable storage medium of claim 7, wherein predefined content includes application demonstration data.

9. The non-transitory machine-readable storage medium of claim 7, wherein a second configuration package is further selected as a function of:
    a first configuration package selected as a function of the received scoping question responses; and
    a configuration package selection constraint of the first configuration package.

10. The non-transitory machine-readable storage medium of claim 7, wherein a second application configuration package is not selected for deployment as a function of an exclusion constraint associated with a first selected application configuration package.

11. The non-transitory machine-readable storage medium of claim 9, wherein the configuration package selection constraint of the first configuration package requires selection of the second application package.

12. The non-transitory machine-readable storage medium of claim 9, wherein application functionality associated with the first application configuration package leverages functionality of the second application configuration package.

13. A system comprising:
    a processor;
    a memory operatively coupled to the processor;
    a data storage device;
    a configuration package repository stored in the memory, wherein the configuration package repository includes at least one configuration package;
    an adaptation catalog stored in the memory, wherein the adaptation catalog includes scoping questions associated with the at least one configuration package for an application to be configured, each configuration package including configuration setting values to configure the application through instantiation of the configuration package in the application;

a configuration scoping application that executes on the processor to:
  determine a scoping question to ask as a function of a received response to at least one other scoping question, wherein possible scoping question responses are associated with at least one application configuration package; and
  select at least one application configuration package for deployment as a function of received scoping question responses; and
  store, on the data storage device, received scoping question responses and the selected application configuration packages; and
a deployment module stored in the memory and executable by the processor to:
  deploy the at least one application configuration package selected for deployment to an application execution environment;
wherein an application configuration package includes an association to content in a content repository.

14. The system of claim 13, wherein content includes application demonstration data.

15. The system of claim 13, wherein a second configuration package is further selected as a function of:
  a first configuration package selected as a function of the received scoping question responses; and
  a configuration package selection constraint of the first configuration package.

16. The system of claim 15, wherein the configuration package selection constraint of the first configuration package requires selection of the second application package.

17. The system of claim 15, wherein application functionality associated with the first application configuration package leverages functionality of the second application configuration package.

* * * * *